Nov. 11, 1930.     A. H. HUMPHREY     1,781,642
LICENSE PLATE HOLDER
Filed April 20, 1928
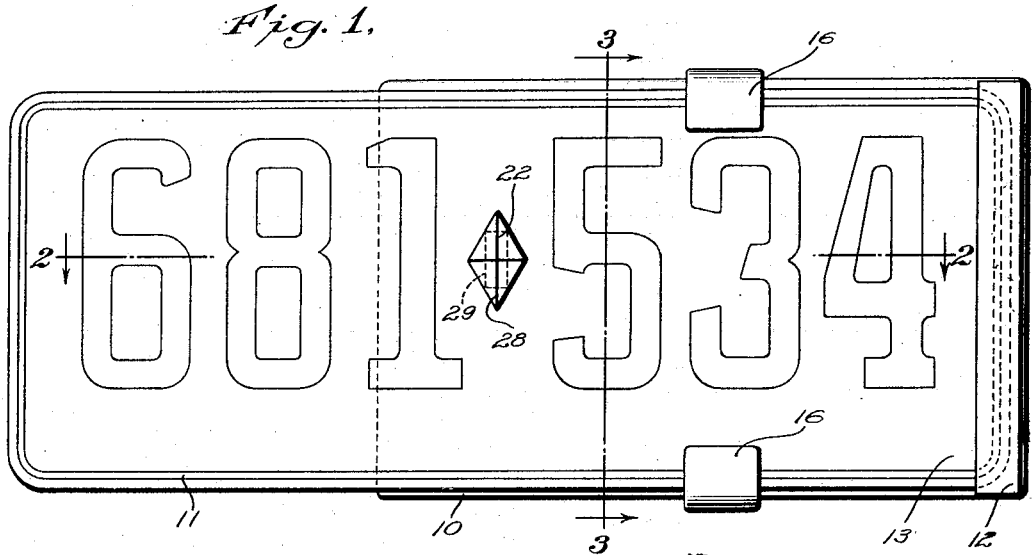
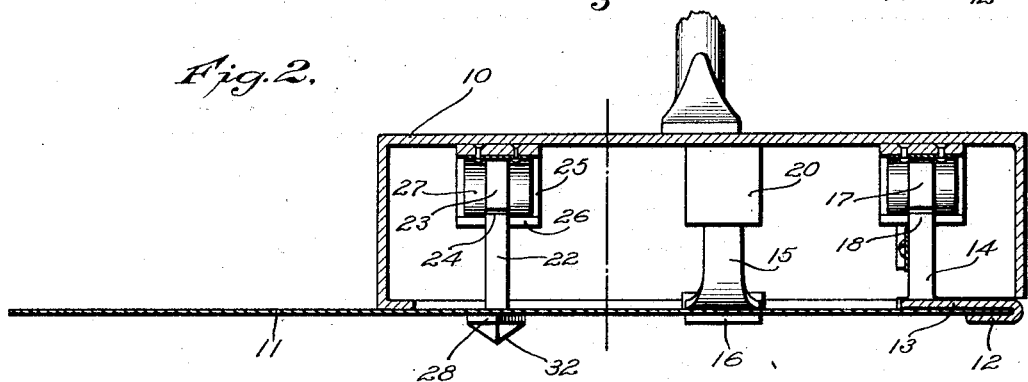
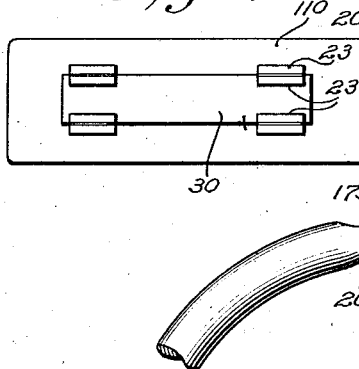
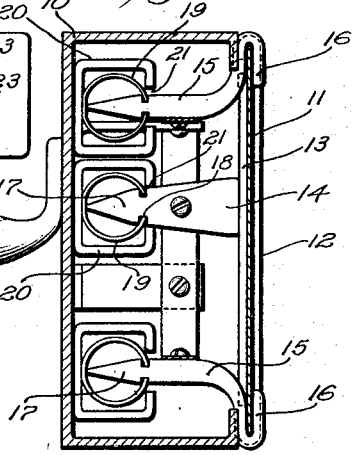
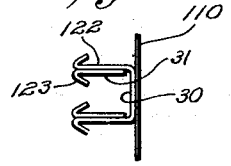
WITNESSES
INVENTOR
A. H. HUMPHREY
BY
ATTORNEY Patented Nov. 11, 1930

1,781,642

UNITED STATES PATENT OFFICE

ALFRED H. HUMPHREY, OF SALEM, NEW YORK

LICENSE-PLATE HOLDER

Application filed April 20, 1928. Serial No. 271,536.

My invention relates to a license plate holder and has for its principal object to hold a license plate substantially as received from the license bureau, in such a manner that the plate must be destroyed in any successful attempt to remove it.

The nature of my invention and its distinctive features and advantages will clearly appear as the description proceeds.

Reference is to be had to the accompanying drawings forming a part of this specification, it being understood that the drawings are merely illustrative of two examples of the invention.

Figure 1 is a front elevation of a license plate and a license plate holder, the latter embodying my invention.

Figure 2 is a longitudinal section as indicated by the line 2—2 of Figure 1.

Figure 3 is a transverse vertical section as indicated by the line 3—3 of Figure 1.

Figure 4 is an elevation of the inner side of a license plate illustrating a slight modification of my invention, and Figure 5 is an edge view of the device shown in Figure 4.

In carrying out my invention in accordance with the illustrated example, a casing 10 is provided on the front of which is adapted to be received the official license plate 11. In the present example one end of the license plate is held under a return flange 12 on a strip 13. On the strip 13 is a latch 14 rigid with said plate 13. In addition to the latch 14, latches 15 are provided at the top and bottom edges of casing 10. The shanks of the latches 15 are return bent to form clips 16 for engaging over the top and bottom edges of license plate 11. Each latch 14, 15, is formed with suitable means to engage a spring catch. In the form shown in Figures 1 to 3, the fastening end of the latches 14, 15, are pointed or have approximately the form of an arrow head, and lateral notches 18 are formed at the base of the head 17. The notches 18 receive the ends of spring catches 19 substantially in the form of resilient split rings. The catches 19 are within housings or guards 20 formed with entrance openings 21 to afford clearance for the head 17 in moving into and out of engagement with the catches 19.

In addition to the latches 14 and 15, I provide for a holding means to positively secure the license plate 11 to the casing 10 in the manner to prevent removal of said license plate without destruction.

In Figures 1 and 2 an additional latch 22 is provided having a head 23 corresponding with the heads 17 and notches 24 corresponding with the notches 18. Also a housing 25 is provided having an opening 26, and within the housing is a spring catch 27 corresponding with the spring catches 19. On the latch 22 is a head 28, and said latch is passed through an opening indicated at 29 in Figure 1, formed in the license plate 11, the head 28 coming to a bearing against the front of the license plate 11.

In Figures 4 and 5 is shown a modification of the latch means, there being latches designated generally by the numeral 122, said latches having returned hook members 123, one of which is formed integral with the plate 30 and the other member 31 of which is brazed or otherwise suitably fastened to said member 30. The plate 30 is secured to the license plate 110 at the inside by brazing, welding or other means, so that the positive locking of the plate to the casing 10 is assured, said latch heads 123 being adapted to engage the spring catches 19.

As shown in Figure 2, the head 28 may have tapered or other projections 32 to prevent the placing of another license plate against the plate 11 without removing the latter.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

I claim:

1. A license plate holder including a casing, catch members held rigid within said casing, a latch associated therewith and adapted to engage a license plate, additional catch members held rigid within said casing, latches associated with said latter catch members, certain of said latches having clips to engage the edges of the license plate and one of said latches having a strip associated therewith and a member rigid with said strip and adapted to receive the end of the license plate.

2. A license plate holder comprising a casing, a plurality of notched latches engageable within said casing, means for locking said latch members within said casing, said locking means including a resilient split ring for each of said notched latches rigidly secured within said casing and engageable with the notched portion of the respective latches, return flanges associated with said latches for receiving and retaining the edges of a license plate, and means receivable within an aperture in the license plate to prevent movement of the license plate from said return flanges, said means including a notched latch engageable with the license plate when the latch is within said casing, and means for locking said latch within said casing, said means including a resilient split ring rigidly secured within said casing and engageable with the notched portion of said latch.

3. A license plate holder comprising a casing, a notched latch engageable within said casing at one end thereof, means for locking said latch member within said casing, said means including a resilient split ring rigidly secured within said casing and engageable with the notched portion of said latch, a return flange associated with said latch for receiving an end of a license plate therein, a pair of additional notched latches engageable within said casing and having return flanges rigidly secured thereto for receiving the license plate therebetween, means for locking said pair of additional notched latches within said casing, said locking means including resilient split rings rigidly secured within said casing and engageable with the notched portion of each of said pair of latches, and means receivable within an aperture in the license plate to prevent removal of the license plate from said return flanges, said means including a notched latch, a head on said latch adapted to bear against the front of the license plate when the latch is engaged within said casing, and means for locking said latch within said casing, said locking means including a resilient split ring rigidly secured within said casing and engageable within the notched portion of said latch.

4. A license plate holder comprising a casing, a notched latch engageable within said casing at one end thereof, means for locking said notched latch member within said casing, said locking means including a resilient split ring engageable with the notched portion of said latch, a housing therefor rigidly secured within said casing and having an aperture registering with the opening of said split ring for receiving said latch member, said split ring being rigidly secured within said housing, a return flange associated with said latch for receiving one end of a license plate therein, a pair of additional notched latches engageable within said casing and having return flanges associated therewith for receiving a portion of the top and bottom edges of the license plate respectively therein, means for locking said pair of additional notched latches within said casing, said locking means including for each of said latter latches a resilient split ring engageable within the notched portion of each of said pair of latches, housings for said resilient split rings rigidly secured within said casing and having an aperture registering with the opening of said split ring for receiving said latch members, said split rings being rigidly secured within their respective housings, and means receivable within an aperture in the license plate to prevent movement of the license plate from said return flanges, said means including a notched latch, a head on said latch adapted to bear against the front of the license plate when the latch is engaged within said casing, said head having a protuberance forming an obstruction against the placing of another license plate adjacent said head, and means for locking said latch within said casing, said locking means including a resilient split ring engageable with the notched portion of said latch, a housing therefor rigidly secured within said casing and having an aperture registering with the opening of said split ring for receiving said latch member, said split ring being rigidly secured within said housing.

ALFRED H. HUMPHREY.